Figure 1:
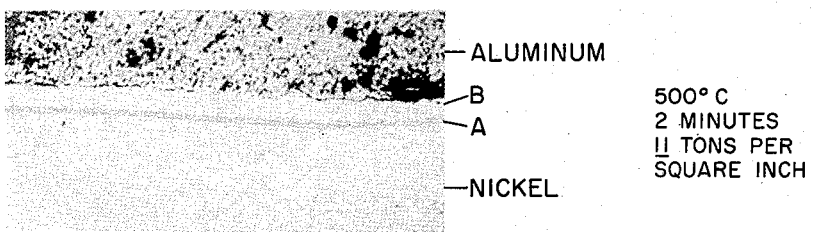

June 10, 1958     S. STORCHHEIM     2,837,818

METHOD OF SOLID STATE WELDING

Filed July 6, 1954

— ALUMINUM
— B
— A
— NICKEL

500° C
2 MINUTES
11 TONS PER SQUARE INCH

— ALUMINUM
— B
— NICKEL

500° C
2 MINUTES
20 TONS PER SQUARE INCH

— ALUMINUM
— B
— NICKEL

500° C
2 MINUTES
23 TONS PER SQUARE INCH

— ALUMINUM
— NICKEL

500° C
2 MINUTES
34 TONS PER SQUARE INCH

*INVENTOR.*
SAMUEL STORCHHEIM
BY

United States Patent Office 2,837,818
Patented June 10, 1958

2,837,818

METHOD OF SOLID STATE WELDING

Samuel Storchheim, Forest Hills, N. Y., assignor, by mesne assignments, to the United States of America as represented by the United States Atomic Energy Commission Application July 6, 1954, Serial No. 441,693

2 Claims. (Cl. 29—494)

The present invention relates generally to the inhibition of formation of alloy zones between metals which tend to form such zones during the process of solid state welding.

Solid state welding is the process of joining metals together at temperatures below the melting points of said metals and usually under pressure. Numerous metals can be joined by this method. One difficulty which has been encountered in the formation of welds or bonds between the different metals is the tendency of the metals to form alloy zones at the interface which zones may be brittle in character. The disadvantage of formation of such zones is that they tend to reduce the strength of the bond therebetween due to their brittle character. Other disadvantages which may be encountered from the formation of such zones are a deleterious change in the corrosion resistance, electric resistivity, impact resistance and ductility as well as efficient heat transfer.

It is an object of the present invention to overcome these difficulties by inhibiting the formation of alloy zones at the metal interfaces.

It is another object of the present invention to provide a method of joining nickel and aluminum by a strong adherent bond.

It is a further object of the present invention to provide a method for improving the quality of bonds formed by solid state welding.

In general the objects of the present invention may be achieved in one of its broader aspects by contacting the dissimilar metals to be joined, heating them to a temperature below the lowest melting point, urging them together at a relatively high pressure and for a relatively short time.

The advantages achieved in carrying out the present method will be evident from a consideration of the accompanying drawing which show micrographs (magnification 1000 diameters) of a cross section of parts of the union produced in accordance with the present invention and illustrative thereof. The significance of the formations shown will be discussed in detail with reference to examples given below.

While it has not been found possible to obtain improvement according to the present method in the joining of all dissimilar metals by solid state welding, the method does make possible such striking improvement in the joining of certain metals that its applicability is thought general for a large number of particular pairs of dissimilar metals. It has been found that improvement can be made in the solid state bonding of metals susceptible to such improvement by appropriate adjustment or regulation of the temperature and pressure and time during which such pressure is applied in forming a bond. The particular values of temperature, pressure and time at pressure are characteristic for a particular pair of dissimilar metals. In general, however, the temperature is below the melting point of the lowest melting metal of the bond or alloy formed in bonding; the pressure and the time are adjusted to values within limits not conventionally employed for solid state bonding.

In carrying out the method, the following procedure may in general be followed with reference to a particular pair of metals to be bonded.

Conventional procedures should be followed in preparing the surfaces for bonding. Such procedure should include preferably a surface preparation so as to precisely conform the surfaces in the areas to be joined. This may be followed by a degreasing operation, as with acetone or trichloroethylene, and a reduction of any oxide on the metal surface. The prepared metal specimens may then be mounted in the desired position for heating and pressing. An inert atmosphere or a vacuum may be employed to protect the metal during the heating operation. Any mode of heating, induction or conduction may be employed so long as the surfaces to be joined are brought to the desired temperature. Only the surfaces need be at the desired temperature, in order for the bond to be formed. Thus if the ends of rods are to be joined, the whole length of rod need not be heated to the same temperature. In this regard the method is similar to conventional welding.

When the specimens have reached the desired temperature, they are urged together under a pressure and for a time which are found preferable for the particular pair of metals to be joined. The method may be more clearly understood from a number of specific examples of which the following are illustrative.

EXAMPLE 1

Specimens of nickel and aluminum metals were prepared for solid state bonding as follows:

The nickel was abraded on its flat surfaces with 320 grit silicon carbide paper to produce clean, smooth surfaces.

The aluminum was chemically cleaned by degreasing in acetone, rinsing with distilled water, immersion for three minutes in 5% NaOH at 70°–80° C., rinsing again with distilled water, immersing for two minutes in 50% $HNO_3$ solution at room temperature, rinsing again in distilled water and drying in a stream of compressed air. One specimen of nickel ¼ inch thick and 1.366 inches in diameter was placed between two specimens of 2 S aluminum ½ inch thick and 1.366 inches in diameter. This sandwich was slipped into a 2 S aluminum sleeve having a 1.440 inch outside diameter and a 1.370 inch inside diameter.

The metal sandwich and liner were placed in an aquadag lubricated tool steel die, 16 inches high and having a 1.440 inch inside diameter between punches of 1.366 diameter made of the same material. The sleeve prevented aquadag from getting in between the surfaces to be joined. The die assembly was located in a cylindrical heating furnace, the temperature of which was controlled by a power transformer.

The die and furnace were in turn centrally placed in a water-cooled, stainless steel pot which could be evacuated. On this pot was bolted a cover containing a centrally located Wilson seal with a ram, one inch in diameter running through it and aligned with the centrally located die.

After sealing, the pot was evacuated with the aid of a roughing and diffusion pump. Heating current was supplied to the furnace after the pressure had been lowered to 5 to 15 microns of mercury. As the furnace heated up, the pressure rose due to outgassing but by the time the specimens were at the proper temperature the pumps had reestablished the 5 to 15 microns pressure.

When the desired temperature and vacuum conditions had been thus established, pressure was applied to the specimens for a predetermined time. When the time elapsed for keeping the specimens under pressure, the pressure was released, the heating current turned off and the assembly allowed to cool. After cooling the die was removed from the pot and the specimen was then machined such that the aluminum sleeve was removed and the nickel and part of the aluminum on both sides of it were taken down to a diameter of 1¼ inches. The remaining aluminum was then threaded and the bar so produced was tested for tensile strength. In all instances the specimens broke during the test at the nickel-aluminum interface and not within the aluminum or nickel.

Table I lists the values of ultimate tensile strength in pounds per square inch as a function of temperature and pressure.

*Table I*

| Four minutes at Pressure in Tons per square inch | Pressing Temperature, ° C. | | | | |
|---|---|---|---|---|---|
| | 400 | 450 | 500 | 550 | 600 |
| 23.0 | | | | | 5,100 |
| 20 | | 10,800 | 19,000 | 4,425 | 2,610 |
| 11 | 30 | 150 | 5,940 | 4,275 | 4,120 |
| 2 | | | zero | 1,250 | 3,550 |

Table II lists the values of ultimate tensile strength in pounds per square inch as a function of time and temperature at a single pressure of 11 tons per square inch.

*Table II*

| Pressing Time, Minutes | Pressing Temperature, ° C. | | |
|---|---|---|---|
| | 500 | 550 | 600 |
| 1 | | | 2,180 |
| 2 | 4,770 | 3,720 | 3,500 |
| 4 | 5,940 | 4,275 | 4,120 |
| 10 | 3,760 | 3,360 | 2,970 |

It is evident from this illustrative example that preferred ranges of temperature, pressure and time exist for the solid state bonding of aluminum to nickel. Thus it is evident that a preferred temperature range is between 450 and 550° C. that a preferred time is of the order of 4 minutes and that a preferred pressure is approximately 15 tons per square inch or higher.

The improvement resulting from the carrying out of the present method, that is, the improvement resulting from bonding dissimilar metals at a high pressure and within a preferred range of time and temperature, as they apply to the bonding of aluminum to nickel, is further evident from a consideration of the appearance of magnified sectional views of the interfaces formed by the solid state joining of these metals.

With reference to the drawing, four micrographs are seen. Each micrograph has a large upper area of aluminum metal and a larger lower area of nickel. The improvement in the bonding of these two metals is evidenced by the differences in the region between these larger areas.

In Figure 1, two alloy zones are evident, one indicated by a dark region A and the other by a lighter region B between the dark region and the upper area of aluminum of the micrograph. This micrograph illustrates the alloy regions formed between specimens of aluminum and nickel which were pressed together at a temperature of approximately 500° C. for 2 minutes at a pressure of 11 tons per square inch.

Figure 2:
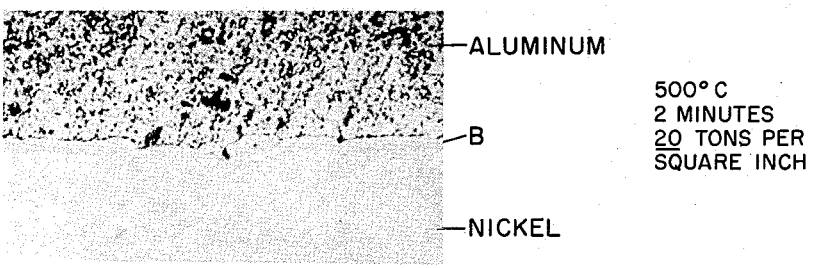

The micrograph of Figure 2 illustrates the effect of increased pressure. It is evident from the second micrograph that the darkened zone A has disappeared and that the lighter zone B is reduced in thickness when the aluminum and nickel are pressed together at 500° C. for 2 minutes under a pressure of 20 tons per square inch.

Figure 3:
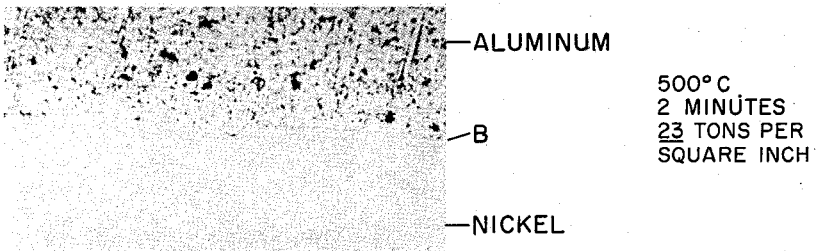

The micrograph of Figure 3 illustrates the result of a further increase in pressure. It is evident that nickel and aluminum pressed together at 500° C. for 2 minutes at 23 tons per square inch results in a further inhibition of the formation of alloy zone B.

Figure 4:
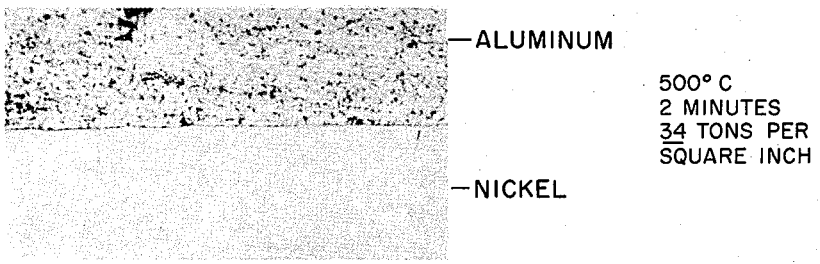

The micrograph of Figure 4 illustrates the result of solid state welding of nickel and aluminum at a temperature of 500° C. for 2 minutes at a pressure of 34 tons per square inch. It is evident that the formation of alloy zones is inhibited to the extent that they are no longer detectable.

It has been determined that 26 tons per square inch is approximately the pressure at which the intermetallic zones are no longer readily detectable. Improvement in the characteristics of the bonds formed as for example the tensile strength of the bonds, was increasingly evident as greater inhibition of alloy zone formation was achieved. The disappearance of the dark zone A occurred at about 15 tons per square inch and was attended by a marked increase in tensile strength.

EXAMPLE 2

Similar results were observed for the formation of bonds between zirconium and aluminum specimens which were joined according to substantially the same procedure as that set out in Example 1 above. The formation of intermetallic zones can be inhibited and the properties such as the tensile strength of the bonds can be benefited by forming the bonds at relatively high temperatures below the melting point, by applying these pressures for relatively short times.

In the case of the zirconium-aluminum bonds, those formed at pressures in excess of 15 tons per square inch and at temperatures in the neighborhood of 550° C. are so strong that the rupture occurs within the aluminum portion rather than at the interface when specimens such as those described with reference to Example 1 are subjected to ultimate tensile strength tests.

EXAMPLE 3

Specimens of copper and aluminum were bonded according to substantially the same procedure set out above with reference to Example 1. Subsequent tests indicated that an optimum temperature of 450 to 525° C. and a time at pressure of 4 minutes resulted in better bonds being formed at higher pressure values, above 11 tons per square inch. Tensile strength specimens broke at the interface without exception.

The copper-aluminum eutectic occurs at 548° C. Copper-aluminum bonds should not be formed above this temperature since the micro structure of such bonds which are heated to as little as two degrees above this temperature exhibit evidence of melting and the bonds themselves exhibit practically no bond strength.

At lower temperatures stronger bonds are formed by maintaining the pressure for a longer period.

It is apparent from the foregoing description and illustrative examples that the present invention provides an unusually effective method of joining certain dissimilar metals. Not all metals are susceptible to improvement in their solid state bonding according to the present method. For example, the growth of intermetallic zones between aluminum and uranium is not inhibited by bonding within the prescribed ranges of temperature, pressure and time at pressure. In fact quite to the contrary the growth of such zones is enhanced by treatment according to the present method. This enhancement of the intermetallic zone growth occurs also for the joining of iron and aluminum. However, one important feature of the invention is that it prescribes the range of temperature, pressure and time at pressure to be investigated with respect to the solid state welding of a particular pair of dissimilar metals which it may prove desirable to join.

Another feature of the invention is that it makes possible the bonding together of metals not normally susceptible to the formation of improved bonds. For example, although as pointed out above, the application of heat and pressure for the time prescribed according to the present method will enhance rather than inhibit the formation of intermetallic zones between aluminum and uranium, it is possible to place a thin layer of nickel between these two metals and by the method of the present invention form the improved bonds between aluminum and nickel and between nickel and uranium. A preferred range for the formation of such bond is a pressure of about 15 tons per square inch, a temperature of 550–575° C. and a time at pressure of 6 minutes.

The same advantages can be achieved in the joining of metal alloy specimens in addition to the joining of pure metals as described above particularly with respect to alloys high in content of one of the metals found to bond advantageously.

Since many applications might be made of the above described invention and since many changes might be made in the method as illustratively described herein, it is to be understood that all matter hereinabove set forth is to be interpreted as illustrative only and not in a limiting sense, except as may be required by the appended claims.

I claim:

1. In the process of cladding uranium with aluminum, the method of providing an improved intermetallic bonding which comprises sandwiching between the aluminum and uranium surfaces to be joined a thin layer of nickel, heating the sandwich to a temperature of approximately 550° C. and urging said surfaces together under a pressure of at least 15 tons per square inch for a period of about 6 minutes.

2. In the process of cladding uranium with aluminum, the method of providing an improved intermetallic bonding which comprises sandwiching between the aluminum and uranium surfaces to be joined a thin layer of nickel, heating the sandwich in a protective atmosphere to a temperature of approximately 550° C. and urging said surfaces together at a pressure of approximately 20 tons per square inch for a period of about 6 minutes.

References Cited in the file of this patent

UNITED STATES PATENTS

| Number | Name | Date |
|---|---|---|
| 383,039 | Burnham | May 15, 1888 |
| 2,094,482 | Weder | Sept. 28, 1937 |
| 2,226,944 | Reeve | Dec. 31, 1940 |
| 2,231,027 | Renner | Feb. 11, 1941 |
| 2,473,712 | Kinney | June 21, 1949 |
| 2,473,888 | Jordan et al. | June 21, 1949 |
| 2,744,314 | Kinney | May 8, 1956 |